(12) United States Patent
Takahashi

(10) Patent No.: US 6,239,408 B1
(45) Date of Patent: May 29, 2001

(54) POSITIONER

(75) Inventor: Wataru Takahashi, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/342,623

(22) Filed: Jun. 29, 1999

(30) Foreign Application Priority Data

Jun. 30, 1998 (JP) .................................................. 10-183739

(51) Int. Cl.[7] ..................................................... B23K 9/32
(52) U.S. Cl. ...................................... 219/159; 219/125.11
(58) Field of Search ............................. 219/159, 125.11, 219/136; 439/11, 13, 15, 29, 30

(56) References Cited

U.S. PATENT DOCUMENTS

| | | | |
|---|---|---|---|
| 4,577,089 | * 3/1986 | Olson et al. | 219/159 |
| 4,831,234 | * 5/1989 | Myers | 219/125.11 |
| 5,813,875 | * 9/1998 | Ishikawa et al. | 439/15 |

* cited by examiner

Primary Examiner—Clifford C. Shaw
(74) Attorney, Agent, or Firm—Wenderoth, Lind & Ponack, L.L.P.

(57) ABSTRACT

A positioner includes a conductive rotary table on which a work-piece is placed, a conductive rotary shaft holding the rotary table, a conductive collector ring fixed concentrically with the rotary shaft, and a carbon brush contacting one face of the collector ring. The carbon brush has radial grooves formed on its contact face with the collector ring, and can be split into plural sections. Abrasive powder produced by friction between the brush and collector ring can be discharged through the grooves to outside of the brush, which eliminates sparks between these two elements, of which durability is thus substantially improved. Further, since the carbon brush is split into plural sections, it can be replaced with ease without dismounting the rotary shaft, which reduces maintenance problems.

34 Claims, 4 Drawing Sheets

POSITIONER

FIELD OF THE INVENTION

The present invention relates to a positioner used for rotating or changing the orientation of a work-piece to be processed such as being welded or cut.

BACKGROUND OF THE INVENTION

In recent years, techniques of industrial robots have progressed rapidly, and consequently, a positioner, one example of robot supporting peripherals, has drawn attention from the market.

A conventional positioner is described with reference to FIG. 4.

FIG. 4 illustrates a construction of the conventional positioner exclusively used for welding. In FIG. 4, rotary table 21 made from conductive material receives jig 32 thereon and rotates jig 32. A work-piece to be processed is positioned with jig 32. Conductive pipe 22 is press-fitted as a rotary shaft into the center of rotary table 21. Conductive collector ring 23 is fixed to a section near to the other end of pipe 22, and a lower face of a collector ring is finished flat and contacts carbon brush 24. Carbon brush 24 is shaped as a ring, and is urged by spring 25 upwardly so that carbon brush 24 keeps contacting with collector ring 23 with a given contact-pressure, and welding current thus runs across carbon brush 24 and collector ring 23. Carbon brush 24 is placed concentrically with rotary shaft 22 in such a manner that it does not directly contact shaft 22. Pins 26 fix carbon brush 24 at its lower face in order to avoid being rotated by frictional force created at the contact face with collector ring 23. Carbon brush 24 is coupled to a welding-power-supply disposed outside with cable 34. Motor 27 drives rotary table 21 and has first pulley 28 on its spin shaft. Rotary shaft 22 has second pulley 29. First and second pulleys 28 and 29 are coupled with timing belt 30 so that the spin of motor 27 is transferred to second pulley 29 via first pulley 28 and timing belt 30, and shaft 22 is thus rotated. Jig 32 mounted on rotary table 21 is usually coupled with hoses, e.g. through which compressed air travels for clamping the work-piece, as well as coupled with cables from a sensor detecting the work-piece. These hoses and cables 33 run through hollow-shaft 22 before being coupled to the work-piece. Outer housing 31 has windows through which a user can monitor an inside operation.

The positioner constructed as discussed above, has the following advantages over a positioner having a carbon brush disposed on an outer rim of a collector that is in contact with the collector ring: the body is smaller in a radial direction, a flat contact face between the collector ring and carbon brush can be easily processed, and its flatness can be easily maintained. The positioner having this structure has been thus widely used.

However, this conventional positioner still has problems, i.e. carbon brush 24 wears out because of abrasion at the contact face with collector ring 23 due to the rotation of rotary table 21. The remaining abrasive powder on the contact face sometimes makes the contact between collector ring 3 and carbon brush 24 unstable. This unstable contact increases a voltage drop on the contact face, which makes welding current unstable. As a result, defective welding occurs. In an extreme case, the contact face would spark, which can damage significantly both the contact faces of the collector ring 23 and carbon brush 24. Therefore, the abrasive powder on carbon brush 24 must be removed, and the damaged contact faces must be repaired, so that additional maintenance cost is required.

Further, the maintenance work, such as replacing the worn-out carbon brush 24, and repairing the contact faces of collector ring 23 and carbon brush 24, requires cumbersome work such as dismounting the rotary shaft 22 in order to remove these elements.

SUMMARY OF THE INVENTION

The present invention addresses the problems discussed above, and aims to provide a positioner which realizes stable welding current by preventing the influence of abrasive powder as well as simplifies the maintenance work of replacing the carbon brush.

In one preferred mode of the present invention, a positioner comprises the following elements:

(a) a conductive rotary table on which a work-piece is placed;

(b) a conductive rotary shaft holding the rotary table;

(c) a conductive collector ring fixed concentrically to the rotary shaft;

(d) a carbon brush contacting a face of the collector ring;

(e) a motor for driving the rotary shaft;

(f) a first pulley disposed on an output shaft of the motor;

(g) a second pulley disposed on the rotary shaft which is coupled to the first pulley with a timing belt so that the rotary shaft can synchronously rotate with the first pulley; and (h) an outer housing for accommodating the rotary shaft driving section including the collector ring and carbon brush.

Radial grooves are formed on the contact face of the carbon brush with the collector ring, and the carbon brush can be split into plural sections.

The positioner of the present invention allows abrasive powders on the contact faces to be discharged through the radial grooves formed on the contact face of the carbon brush. The contact between the collector ring and carbon brush thus becomes stable, and neither an abnormal-voltage-drop nor spark occur therebetween. The collector ring and carbon brush thus become much more durable. Further, because the carbon brush can be split into plural sections, it can be replaced without dismounting the rotary shaft of the positioner.

DESCRIPTION OF THE PREFERRED EMBODIMENT

Figure 1:
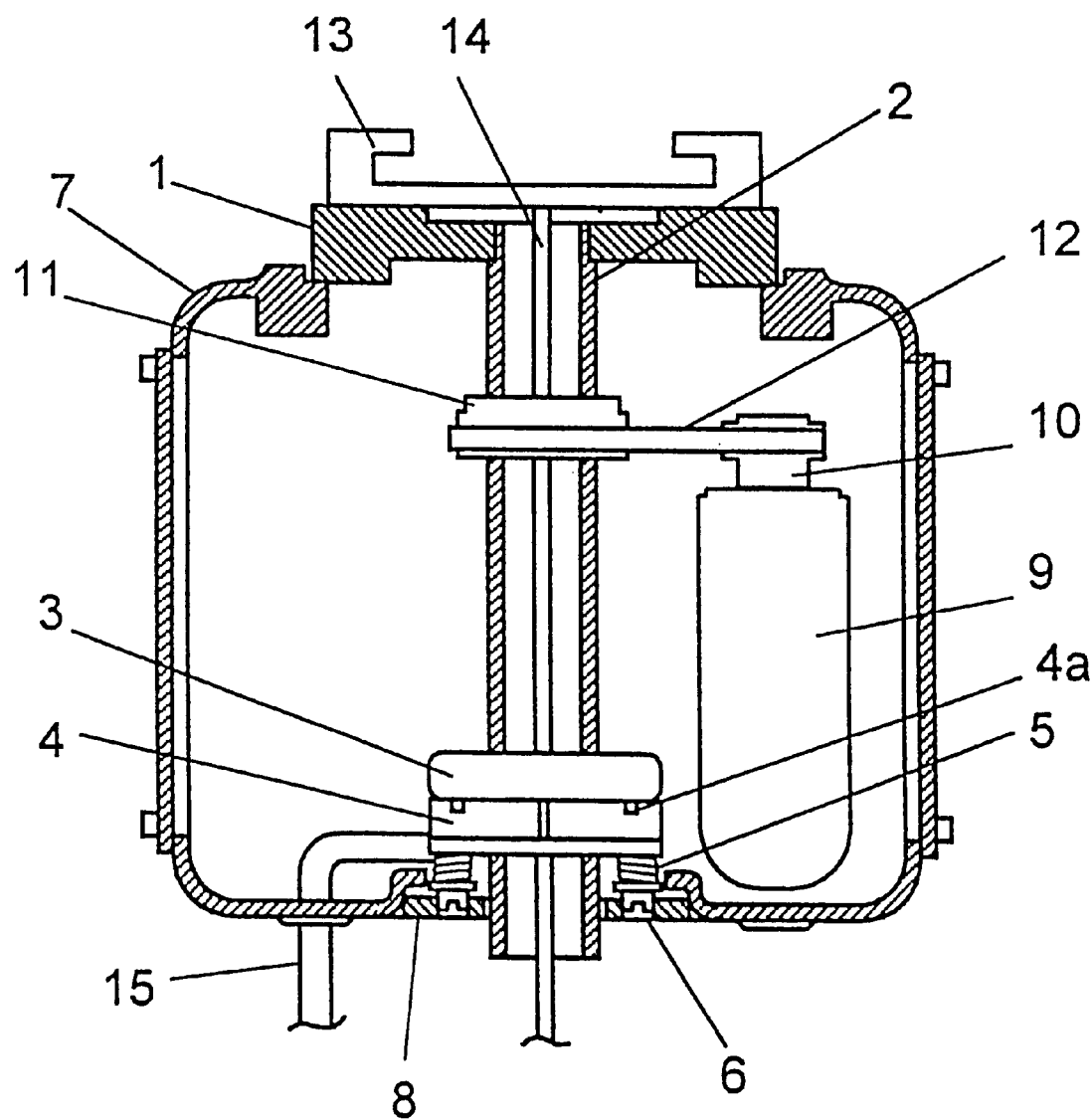
FIG. 1 shows a construction of a positioner in accordance with an exemplary embodiment of the present invention.
Figure 2A:
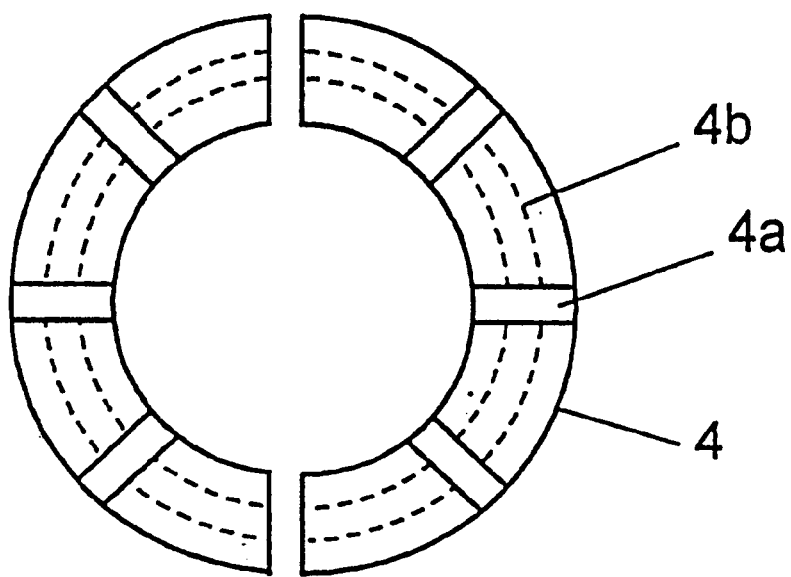
FIG. 2A is a plan view illustrating a carbon brush of the present invention.
Figure 2B:
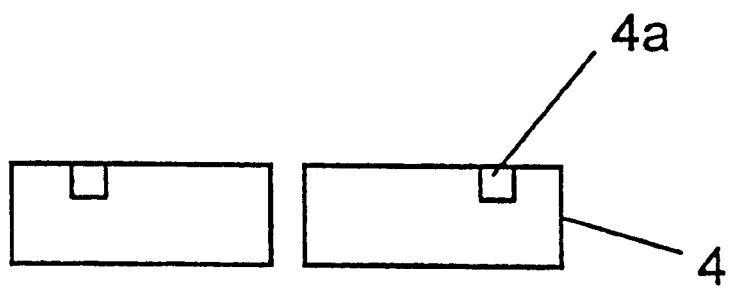
FIG. 2B is a side view illustrating the carbon brush of the present invention.

An exemplary embodiment of the present invention is described hereinafter with reference to the accompanying drawings. FIG. 1 illustrates an exemplary embodiment of the present invention. FIG. 2A and FIG. 2B show a carbon brush employed in a positioner of the present invention.

In FIG. 1, on the rotary table 1, made from conductive material, a work-piece is placed with jig 13. At the center of rotary table 1, conductive rotary shaft 2 is mounted by press-fitting or other methods. Conductive collector ring 3 is fixed to the other end of shaft 2, and a lower face of collector ring is finished flat and contacts carbon brush 4. Carbon brush 4 is shaped as a ring, and is urged by spring 5 upwardly so that carbon brush 4 stays in contact with collector ring 3 with a given contact-pressure. Welding current thus runs across carbon brush 4 and collector ring 3. Carbon brush 4 is placed concentrically with rotary shaft 2 in such a manner that it does not directly contact shaft 2. Pins 6 fix carbon brush at its lower face in order to prevent its rotation resulting from frictional force created at the contact face with collector ring 3. Pins 6 are inserted into holes punched on insulator plate 8 disposed at the lower section of outer housing 7. Because pins 6 are inserted slidably into the holes, carbon brush 4 can keep the given contact pressure against collector ring 3 by spring 5, also carbon brush 4 is prevented from being rotated by the rotation of collector ring 3.

Motor 9 drives rotary table 1 and has first pulley 10 on its spin shaft. Rotary shaft 2 has second pulley 11. First and second pulleys 10 and 11 are coupled with timing belt 12 so that the spin of motor 9 is transferred to second pulley 11 via first pulley 10 and timing belt 12, and shaft 2 is thus rotated. The embodiment in FIG. 1 employs pulleys and a timing belt as a mechanism of transferring the driver power of motor 9. However, other mechanisms, e.g. those comprising a plurality of gears, can produce the same result.

Jig 13 mounted on rotary table 1 is usually coupled with hoses, e.g. through which compressed air travels for clamping the work-piece, as well as cables from a sensor detecting the work-piece. These hoses and cables 14 run through hollow shaft 2 before being coupled to jig 13. Cable 15 coupled to carbon brush 4 forms a path for welding current.

Carbon brush 4 in accordance with this exemplary embodiment is detailed hereinafter. FIG. 2A and FIG. 2B illustrate an example of a carbon brush. FIG. 2A is a plan view of carbon brush 4 split into two sections. Radial grooves 4a are formed on an upper face of carbon brush 4. FIG. 2B is a side view of carbon brush 4. Since an end face of groove 4a opens to the outside of the rim, FIG. 2B shows the end face of grooves 4a. Radial grooves 4a are formed on an upper face of carbon brush 4. FIG. 2B is a side view of carbon brush 4. Since an end face of groove 4a opens to outer rim, FIG. 2B shows the end face of grooves 4a.

Abrasive powder produced by the abrasion between carbon brush 4 and collector ring 3 is thus collected in the grooves 4a formed on the upper face of carbon brush 4, and travels along grooves 4a to the outside. The powder is thus discharged. This construction leaves no chances for the abrasive powder to remain between collector ring 3 and carbon brush 4. The contact between the collector ring 3 and carbon brush 4 thus becomes stable, and neither an abnormal-voltage-drop nor spark occurs therebetween. Collector ring 3 and carbon-brush 4 thus become much more durable.

Because carbon brush 4 is split into two sections, it can be removed just by pulling out pins 6, which eliminates cumbersome work, i.e. dismounting the positioner per se including pulling out the rotary shaft 2. Carbon brush 4 can thus easily be restored through a reverse procedure.

In this embodiment, radial grooves are formed on the upper face of carbon brush 4; however, in addition to the radial grooves, arc-shaped grooves 4b as shown in broken lines can be formed concentrically with shaft 2 on the upper face, thereby increasing the effect. The concentric grooves 4b can be formed in multi-layered structure, e.g. double or three-layer. The cross section of the groove 4a is depicted as being rectangular; however, it can be U-shaped or V-shaped.

Figure 3:
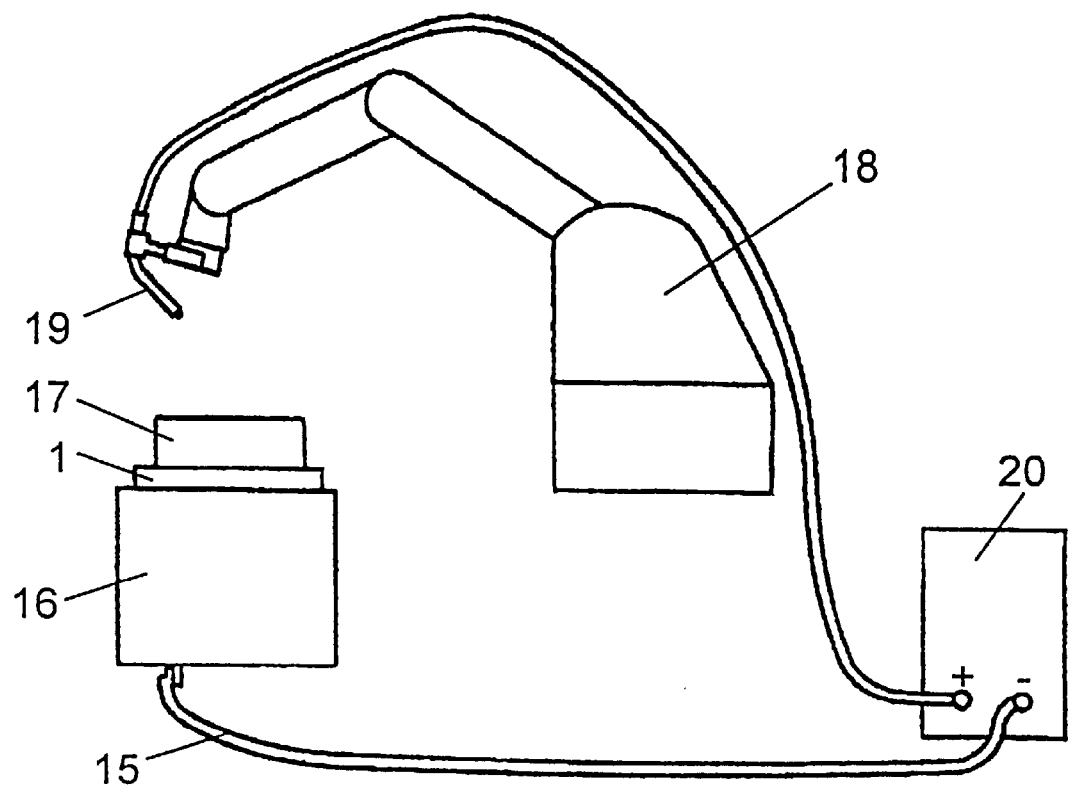
FIG. 3 illustrates a construction of a welding system that employs a robot and a positioner.
Figure 4:
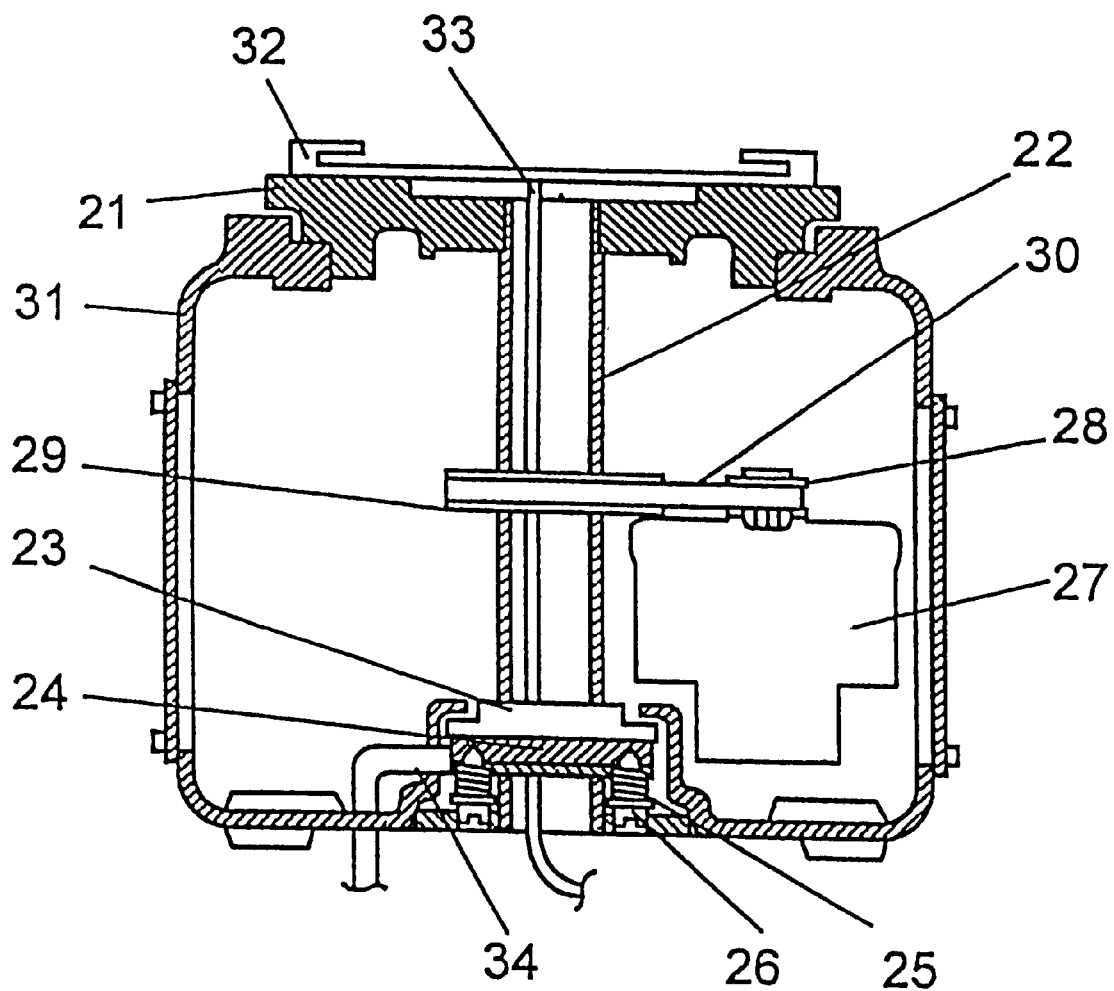
FIG. 4 shows a construction of a conventional positioner.

FIG. 3 illustrates a welding system employing a robot and the positioner of the present invention. In FIG. 3, work-piece 17 (in this case, the work-piece is to be welded) is placed on the rotary table 1 of positioner 16. Welding torch 19 is mounted on a tip of robot 18, and coupled to an output terminal of welding power supply 20. The polarity of welding power supply 20 depends on a welding method to be practiced. Cable 15 pulled out from positioner 16 is coupled to an output terminal of another polarity of the welding power supply.

Cable 15 is electrically coupled to rotary table 1 via carbon brush 4, collector ring 3 and rotary shaft 2. An electric arc is generated between the work-piece 17 held on table 1 and welding torch 19, thereby welding the work-piece.

The exemplary embodiment of the positioner of the present invention discussed above proves that the abrasive powder produced by the friction between the carbon brush and collector ring in the grooves formed on the upper face of the carbon brush, and is discharged through the grooves to the outside. The positioner of the present invention thus leaves no chances for the abrasive powder to remain between the collector ring and carbon brush. The contact resistance between the collector ring and carbon brush, therefore, becomes stable, so that stable welding can be practiced continuously. Since no spark is generated between the collector ring and carbon brush, both the elements become more durable.

Since the carbon brush is split into two sections, it can be removed and restored with ease, and this structure makes it unnecessary to disassemble the positioner including dismounting the rotary shaft 2. The construction of the positioner thus reduces maintenance problems.

The present invention provides an excellent and durable positioner that practices stable welding and reduces maintenance problems.

What is claimed is:

1. A positioner comprising:
   (a) a conductive rotary table on which a work-piece is to be disposed;
   (b) a conductive rotary shaft holding said rotary table;
   (c) a collector ring fixed to said rotary shaft; and
   (d) a brush contacting said collector ring and having at least one groove formed on a contact face with said collector ring.

2. The positioner as defined in claim 1 wherein said at least one groove comprises a radial groove.

3. The positioner as defined in claim 1 wherein said at least one groove comprises a plurality of grooves that are radial and at least one of the grooves opens to outside of said brush.

4. The positioner as defined in claim 1 wherein said brush is split into at least two sections and wherein the grooves are radial.

5. The positioner as defined in claim 1 wherein said brush is split into at least two sections, and wherein said at least one groove comprises a plurality of grooves that are radial and at least one of the grooves opens to outside of said brush.

6. The positioner as defined in claim 1 wherein said brush comprises carbon and the grooves are radial.

7. The positioner as defined in claim 1 wherein said brush comprises carbon, and wherein said at least one groove comprises a plurality of grooves that are radial and at least one of the grooves opens to outside of said brush.

8. The positioner as defined in claim 1 wherein said brush comprises at least two sections comprising carbon, and wherein the grooves are radial.

9. The positioner as defined in claim 1 wherein said brush comprises at least two sections comprising carbon, and wherein said at least one groove comprises a plurality of grooves that are radial and at least one of the grooves opens to outside of said brush.

10. The positioner as defined in claim 1 wherein said at least one groove comprises a plurality of radial grooves and a groove concentric with said rotary shaft.

11. The positioner as defined in claim 1 wherein said at least one groove comprises a plurality of radial grooves and a groove concentric with said rotary shaft, and at least one of the grooves opens to outside of said brush.

12. The positioner as defined in claim 1 wherein said brush comprises at least two sections comprising carbon, and wherein said at least one groove comprises a plurality of radial grooves and a groove concentric with said rotary shaft.

13. The positioner as defined in claim 1 wherein said brush comprises at least two sections comprising carbon, and said at least one groove comprises a plurality of radial grooves and a groove concentric with said rotary shaft, and at least one of the grooves opens to outside of said brush.

14. The positioner as defined in claim 1 wherein said b rush comprises carbon, and wherein said at least one groove comprises a plurality of radial grooves and a groove concentric with said rotary shaft.

15. The positioner as defined in claim 1 wherein said brush comprises carbon, and wherein said at least one groove comprises a plurality of radial grooves and a groove concentric with said rotary shaft, and at least one of the grooves opens to outside of said brush.

16. The positioner as defined in claim 1 wherein said brush comprises at least two sections comprising carbon, and said at least one groove comprises a plurality of radial grooves and a groove concentric with said rotary shaft.

17. The positioner as defined in claim 1 wherein said brush comprises at least two sections, and said at least one groove comprises a plurality of radial grooves and a groove concentric with said rotary shaft, and at least one of the grooves opens to outside of said brush.

18. A positioner comprising:
(a) a conductive rotary table on which a work-piece is to be disposed;
(b) a conductive rotary shaft holding said rotary table;
(c) a collector ring fixed to said rotary shaft;
(d) a brush contacting said collector ring and having at least one groove formed on a contact face with said collector ring;
(e) a driving device that drives said rotary shaft; and
(f) an outer housing that accommodates said collector ring and said brush.

19. The positioner as defined in claim 18 wherein said at least one groove comprises a radial groove.

20. The positioner as defined in claim 18 wherein said at least one groove comprises a plurality of grooves that are radial and opens to outside of said brush.

21. The positioner as defined in claim 18 wherein said brush is split into at least two sections and wherein the grooves are radial.

22. The positioner as defined in claim 18 wherein said brush is split into at least two sections, and wherein said at least one groove comprises a plurality of grooves that are radial and opens to outside of said brush.

23. The positioner as defined in claim 18 wherein said brush comprises carbon and the grooves are radial.

24. The positioner as defined in claim 18 wherein said brush comprises carbon, and wherein said at least one groove comprises a plurality of grooves that are radial and opens to outside of said brush.

25. The positioner as defined in claim 18 wherein said brush comprises at least two sections comprising carbon, and wherein the grooves are radial.

26. The positioner as defined in claim 18 wherein said brush comprises at least two sections comprising carbon, and wherein said at least one groove comprises a plurality of grooves that are radial and opens to outside of said brush.

27. The positioner as defined in claim 18 wherein said at least one groove comprises a plurality of radial grooves and a groove concentric with said rotary shaft.

28. The positioner as defined in claim 18 wherein said at least one groove comprises a plurality of radial grooves and a groove concentric with said rotary shaft, and at least one of the grooves opens to outside of said brush.

29. The positioner as defined in claim 18 wherein said brush comprises at least two sections comprising carbon, and wherein said at least one groove comprises a plurality of radial grooves and a groove concentric with said rotary shaft.

30. The positioner as defined in claim 18 wherein said brush comprises at least two sections comprising carbon, and wherein said at least one groove comprises a plurality of radial grooves and a groove concentric with said rotary shaft, and at least one of the grooves opens to outside of said brush.

31. The positioner as defined in claim 18 wherein said brush comprises carbon, and wherein said at least one groove comprises a plurality of radial grooves and a groove concentric with said rotary shaft.

32. The positioner as defined in claim 18 wherein said brush comprises carbon, and wherein said at least one groove comprises a plurality of radial grooves and a groove concentric with said rotary shaft, and at least one of the grooves opens to outside of said brush.

33. The positioner as defined in claim 18 wherein said brush comprises at least two sections comprising carbon, and said at least one groove comprises a plurality of radial grooves and a groove concentric with said rotary shaft.

34. The positioner as defined in claim 18 wherein said brush comprises at least two sections, and wherein said at least one groove comprises a plurality of radial grooves and a groove concentric with said rotary shaft, and at least one of the grooves opens to outside of said brush.

* * * * *